Feb. 18, 1936.                 H. DURST                     2,031,148
                               TROLLEY
                        Filed Feb. 12, 1935          2 Sheets-Sheet 1
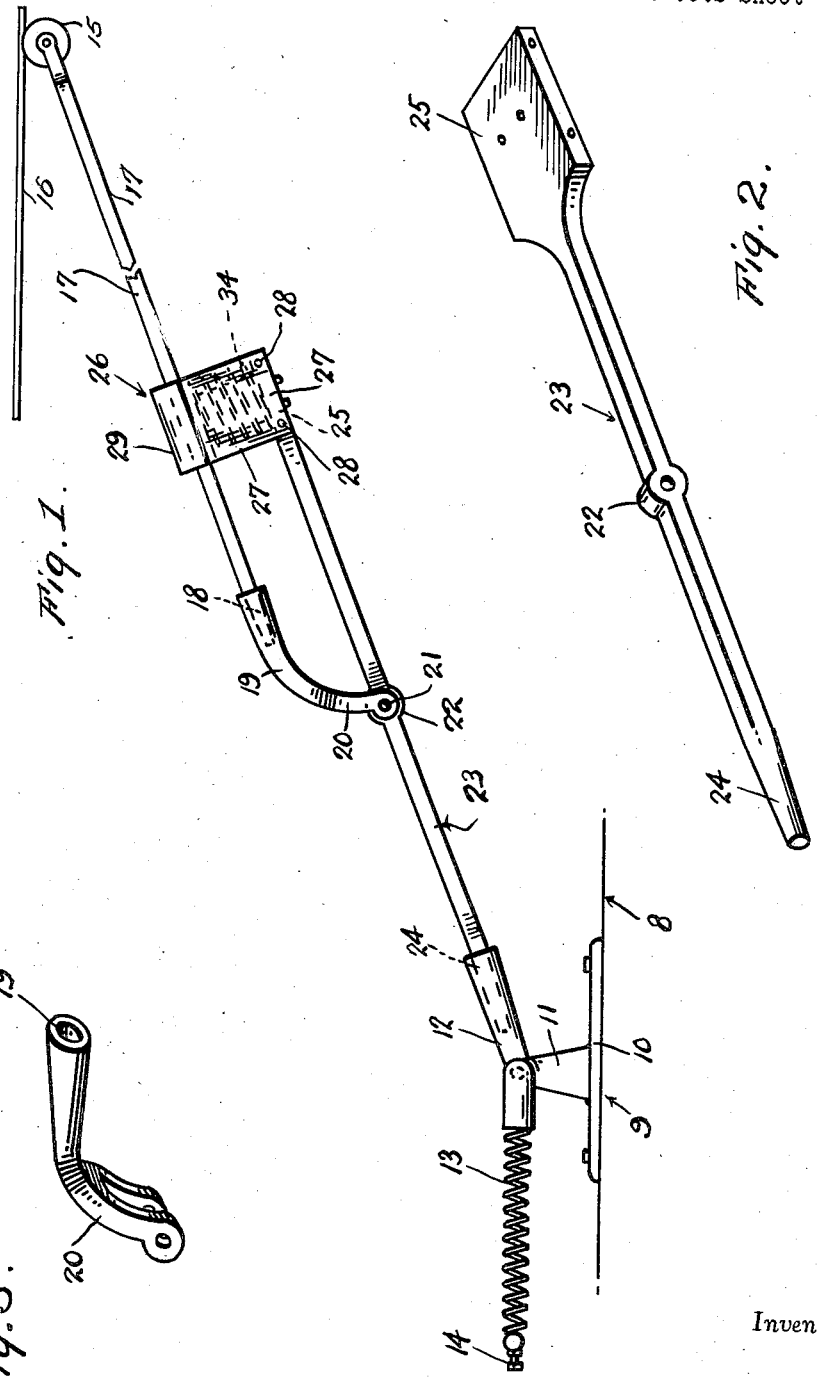
Inventor
H. Durst
By [signature] O'Brien
Attorney Feb. 18, 1936.                H. DURST                  2,031,148
                               TROLLEY
                         Filed Feb. 12, 1935           2 Sheets-Sheet 2
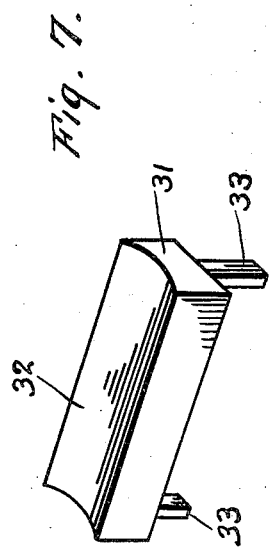
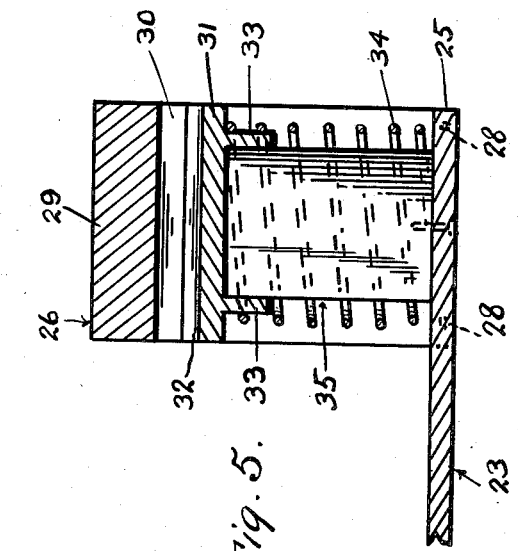
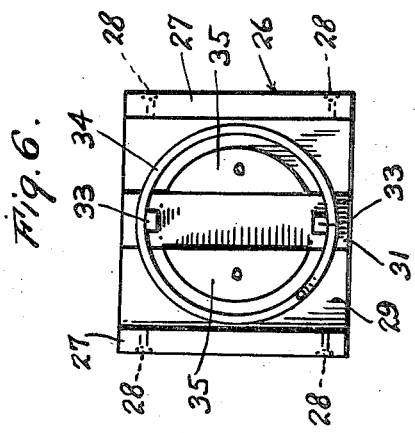
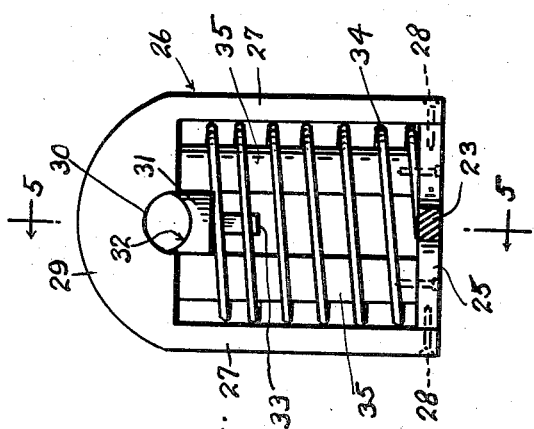
Inventor
H. Durst
By Clarence A O'Brien
Attorney Patented Feb. 18, 1936

2,031,148

UNITED STATES PATENT OFFICE 2,031,148

TROLLEY

Henry Durst, Denver, Colo.

Application February 12, 1935, Serial No. 6,231

4 Claims. (Cl. 191—64)

This invention relates to an improved trolley such as is used on street cars and the like for conveying electrical current from the overhead trolley wire to the motor in the car in a well known manner.

As a general proposition, present day trolley structures include a pivotally mounted trolley pole having a pulley or sheave at the free end for contact with the trolley wire. The pivoted end is provided with spring tensioning means for maintaining the sheave in constant contact with wire. Under certain circumstances, however, the trolley jumps the wire causing delay and damage.

My primary aim is to provide a so-called "jumpless" trolley wherein the trolley pole is made up of two companion sections pivotally connected together and having associated therewith a unique spring equipped jointing device intended to serve as a compensating means to insure effective and constant maintenance of the pulley in contact with the wire and to thereby avoid jumping.

One feature of the construction is predicated upon the special design of the companion sections which make up the trolley pole as a unit, the complemental ends of these sections being so connected together as to allow a predetermined relative movement calculated to be sufficient to allow the main spring on the pivotal mounting to hold the sections yieldably in contact with the wire, but to allow the upper section to have a slight downward compensating movement in relation to the lower section in a manner to overcome any likelihood of the trolley jumping the wire.

A feature of essential importance is predicated upon the adoption and use of the coupling and jointing means between the associated ends of the two sections of the trolley pole, this embodying a guide having a spring pressed follower member therein to provide the requisite compensating results.

Other features and advantages will become more readily apparent from the following description and drawings.

In the accompanying illustrative drawings, wherein like numerals are employed to designate like parts, throughout the views:

Figure 1 is a side view showing the complete trolley construction and illustrating the manner in which it cooperates with the overhead trolley wires.

Figure 2 is a perspective of the lower section of the trolley pole.

Figure 3 is a perspective of one of the details in the pole construction.

Figure 4 is an enlarged sectional view showing the jointing and guide means between the companion pole section.

Figure 5 is a view at right angles to Figure 4 the section being taken on the plane of the line 5—5 of Figure 4.

Figure 6 is a bottom plan view.

Figure 7 is a perspective of the spring pressed follower block.

Referring now to the drawings by distinguishing reference numerals and to Figure 1, it will be observed that the top of the car is denoted by the numeral 8. This is provided with a conventional trolley pole bracket 9 including a base plate 10 having a standard 11 to which a socket or fixture 12 is pivotally attached in the usual way. Cooperating with this is the main pole retention spring 13 having the customary adjusting means 14. All of these parts are conventional. So is the pulley or sheave 15 which is in contact with the overhead trolley wire 16. Not only this, the upper section of the two-part pole, that is the part indicated by the numeral 17 may be a conventional trolley pole. In the present instance, the tapered lower end 18 thereof, fits into a ferrule or socket 19 forming a part of a fork 20 pivotally attached as at 21 to the central portion 22 of the lower section 23 of the pole. These two parts make up the complete pole. It will be noticed that this lower section 23 of the pole has a tapered end 24 fitting into the pivoted socket 12. Moreover the outer end of this section 23 is formed with a paddle-like head 25 which serves as an attaching base for the coupling or jointing unit 26. This part 26 is in the nature of a hood whose sides 27 are fastened as at 28 to the head 25. The crown or bight portion 29 of the hood is formed in its underside with a guide groove 30 to accommodate the upper half portion of the upper section of the trolley. This allows the upper section to have a vertical movement but substantially eliminates side or lateral swing. Mounted for sliding or reciprocatory movement in this hood is a follower block 31 having a groove 32 which corresponds with the groove 30. It is in these grooves that the upper section of the trolley pole is fitted. The block is provided with depending lugs 33 cooperable with the upper convolutions of a coil spring 34. The coil spring surrounds and is held in place by a pair of opposed segmental guides or uprights 35 attached to the head 25 and formed as a part of the hood. These guides 35 are disposed in spaced parallelism and permit the follower block to move therebetween. Thus, in a sense, we have a substantially U-shaped hood attached to the outer end of the pivoted lower pole section 23 which hood serves as a guide and stabilizing device for the upper pole section. The upper pole section has its lower end pivotally attached by the bracket 19 to the intermediate part of the lower pole section 23 and by associating with the hood the spring pressed follower arrangement it is evident that a novel compensating and equalizing device is provided. That is to say, the pole as a unit including both parts is resiliently pressed upwardly by the customary spring means 13. The upper section however, has an independent downward movement due to the presence of the spring pressed follower arrangement and jointing means. Hence, this yieldable compensating action serves as a safeguard to keep the sheave 15 in constant contact with the wire 16 and this prevents jumping.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a trolley pole construction, a lower section, an upper section provided with a pulley, a fork pivotally attached to the intermediate portion of the lower section, said upper section being detachably joined to said fork to provide a pivotal connection between the two sections the lower section having a paddle-like support on its free end, a U-shaped jointing member carried by the lower section, said upper section passing therethrough, and a spring pressed follower cooperable with the upper section and disposed in the U-shaped member to resiliently maintain the sections in operative positions.

2. In a structural assemblage of the class described, a lower pole section having a head at its outer end, a pivoted bracket intermediate its end, an upper section having a pulley at its outer end, the lower end thereof being joined to said bracket, a compensating device on the outer end of said lower section including a grooved guide with which said upper pole section is cooperable, and a spring pressed grooved follower block mounted in said compensating device and cooperable with the grooved portion thereof as well as with the adjacent portion of said upper pole section to resiliently maintain the sections in operative positions.

3. A component part of the trolley pole structure comprising a lower pole section having its lower end tapered and formed at its outer end with a plate-like head forming a base, a fork pivoted to the intermediate portion of said section and provided with a laterally directed socket to accommodate a trolley pole of a conventional type, and a U-shaped member attached to said plate, said U-shaped member having a guide groove, a coil spring held in place by said U-shaped member and a spring pressed follower block cooperable with said spring, said grooved portion and said pole to resiliently hold said pole sections in position.

4. In a trolley pole construction, a lower pole section, an upper pole section provided with a pulley, a fork pivotally attached to the intermediate portion of the lower section, said upper section being detachably joined to said fork to provide a pivotal connection between the two sections, the lower section adjacent the fork end of the upper section being provided with a paddle-like support, an inverted U-shaped member carried by the lower section and secured to said paddle-like support, the bight portion of the inverted U-shaped member being provided with a transverse groove, said upper section passing through the groove, and disposed therein, spaced upstanding guide supports in said U-shaped member and secured to the paddle-like support, a follower disposed and slidable between said support and cooperating with the groove in said bight portion, and a coil spring encircling said support and normally urging said follower into contacting engagement with the lower portion of the upper section.

HENRY DURST.